United States Patent
Ruxton et al.

(10) Patent No.: US 10,596,761 B2
(45) Date of Patent: *Mar. 24, 2020

(54) METHOD AND SYSTEM FOR 3-D PRINTING OF 3-D OBJECT MODELS IN INTERACTIVE CONTENT ITEMS

(71) Applicant: Google LLC, Mountain View, CA (US)

(72) Inventors: Adam Ruxton, San Francisco, CA (US); Christopher Sean Ivester, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,434

(22) Filed: Oct. 26, 2017

(65) Prior Publication Data
US 2018/0043620 A1 Feb. 15, 2018

Related U.S. Application Data

(63) Continuation of application No. 14/280,092, filed on May 16, 2014, now Pat. No. 9,827,714.

(51) Int. Cl.
*B29C 64/386* (2017.01)
*G06Q 30/06* (2012.01)
*G06Q 30/02* (2012.01)

(52) U.S. Cl.
CPC ....... *B29C 64/386* (2017.08); *G06Q 30/0276* (2013.01); *G06Q 30/0621* (2013.01)

(58) Field of Classification Search
CPC ............ B29C 67/0088; G06Q 30/0621; G06Q 30/0276
See application file for complete search history.

(56) References Cited

U.S. PATENT DOCUMENTS

| | | | |
|---|---|---|---|
| 5,204,055 | A | 4/1993 | Sachs et al. |
| 5,808,613 | A | 9/1998 | Marrin et al. |
| 6,222,551 | B1 | 4/2001 | Schneider et al. |
| 6,336,099 | B1 | 1/2002 | Barnett et al. |
| 6,363,404 | B1 | 3/2002 | Dalal et al. |
| 6,445,387 | B1 | 9/2002 | Choi et al. |

(Continued)

OTHER PUBLICATIONS

"3DCar—The Interactive Full 30 Car Configurator", 3DCar Car Configurator, Mar. 28, 2012, retrieved from http://www.3dcarconfigurator.com/.

(Continued)

*Primary Examiner* — Charles E Anya
(74) *Attorney, Agent, or Firm* — Foley & Lardner LLP (57) ABSTRACT

According to at least one illustrative embodiment, a computer device and a corresponding method of enabling customization and 3-D prototyping of a 3-D representation of an object illustrated by an interactive content item comprise providing, by the computer device, an interactive content item including a representation of a three-dimensional (3-D) object to a client device. Upon an end user of the client device interacts with the interactive content item and provides one or more customization parameters for a 3-D representation of the 3-D object, the computer device receives the one or more customization parameters from the client device. The computer device then cause a 3-D representation of the 3-D object to be printed by a 3-D printer associated with the client device.

18 Claims, 5 Drawing Sheets

(56) References Cited

U.S. PATENT DOCUMENTS

| | | |
|---|---|---|
| 6,483,508 B1 | 11/2002 | Ishikawa |
| 6,496,857 B1 | 12/2002 | Dustin et al. |
| 6,636,210 B1 | 10/2003 | Cheng |
| 6,753,857 B1 | 6/2004 | Matsuura et al. |
| 6,944,513 B1 | 9/2005 | Tomomitsu et al. |
| 7,079,990 B2 | 7/2006 | Haller et al. |
| 7,171,344 B2 | 1/2007 | Lind |
| 7,262,783 B2 | 8/2007 | Kramer et al. |
| 7,296,297 B2 | 11/2007 | Kirkpatrick et al. |
| 7,337,093 B2 | 2/2008 | Ramani et al. |
| 7,353,192 B1 | 4/2008 | Ellis et al. |
| 7,388,986 B2 | 6/2008 | Bober et al. |
| 7,444,195 B2 | 10/2008 | Smith et al. |
| 7,464,344 B1 | 12/2008 | Carmichael et al. |
| 7,467,356 B2 | 12/2008 | Gettman et al. |
| 7,477,285 B1 | 1/2009 | Johnson |
| 7,580,926 B2 | 8/2009 | Kapur et al. |
| 7,599,918 B2 | 10/2009 | Shen et al. |
| 7,620,638 B2 | 11/2009 | Nonclercq et al. |
| 7,908,178 B2 | 3/2011 | Nykamp |
| 7,930,206 B2 | 4/2011 | Koningstein |
| 7,991,806 B2 | 8/2011 | Broder et al. |
| 8,005,715 B2 | 8/2011 | Smith et al. |
| 8,082,076 B2 | 12/2011 | Sells et al. |
| 8,117,197 B1 | 2/2012 | Cramer |
| 8,117,558 B2 | 2/2012 | Hoguet |
| 8,125,481 B2 | 2/2012 | Gossweiler et al. |
| 8,175,922 B2 | 5/2012 | Jones et al. |
| 8,229,911 B2 | 7/2012 | Bennett |
| 8,244,025 B2 | 8/2012 | Davis et al. |
| 8,275,661 B1 | 9/2012 | Ponte et al. |
| 8,314,789 B2 | 11/2012 | Fitzmaurice et al. |
| 8,314,790 B1 | 11/2012 | Zeiger et al. |
| 8,350,848 B2 | 1/2013 | Gossweiler et al. |
| 8,380,563 B2 | 2/2013 | Datar et al. |
| 8,392,257 B2 | 3/2013 | Jones et al. |
| 8,456,467 B1 | 6/2013 | Hickman et al. |
| 8,473,349 B1 | 6/2013 | Manber et al. |
| 8,494,902 B2 | 7/2013 | Krantz et al. |
| 8,497,859 B1 | 7/2013 | Hickman et al. |
| 8,515,982 B1 | 8/2013 | Hickman et al. |
| 8,520,982 B2 | 8/2013 | Chan et al. |
| 8,732,591 B1 | 5/2014 | Mendes Da Costa et al. |
| 8,756,510 B2 | 6/2014 | Bhumkar et al. |
| 8,854,362 B1 | 10/2014 | Poursohi et al. |
| 8,966,356 B1 | 2/2015 | Hickman et al. |
| 8,990,105 B1 | 3/2015 | Shatkin-Margolis et al. |
| 8,990,239 B2 | 3/2015 | Butler |
| 9,019,266 B2 | 4/2015 | Hoguet |
| 9,026,935 B1 | 5/2015 | Rasmussen et al. |
| 9,053,158 B1 | 6/2015 | Lee |
| 9,075,931 B2 | 7/2015 | Charles et al. |
| 9,183,672 B1 | 11/2015 | Hickman et al. |
| 9,195,997 B2 | 11/2015 | Jevtic et al. |
| 9,245,064 B2 | 1/2016 | Loberg |
| 9,372,871 B2 | 6/2016 | Ovsjanikovs et al. |
| 9,411,901 B2 | 8/2016 | Bacus et al. |
| 9,443,263 B1 | 9/2016 | Kim |
| 9,483,508 B1 | 11/2016 | Wilkes et al. |
| 9,536,340 B2 | 1/2017 | Loberg |
| 9,827,714 B1 | 11/2017 | Ruxton et al. |
| 9,956,009 B1 | 5/2018 | Shoshtaev |
| 10,049,170 B1 | 8/2018 | Long et al. |
| 10,067,916 B2 | 9/2018 | Kirillov et al. |
| 10,108,988 B2 | 10/2018 | Chakrabarti et al. |
| 10,354,294 B2 | 7/2019 | Long et al. |
| 10,402,852 B2 | 9/2019 | Zhang et al. |
| 10,417,661 B2 | 9/2019 | Bhattacharjee et al. |
| 10,423,674 B1 | 9/2019 | Burriesci et al. |
| 2001/0037191 A1 | 11/2001 | Furuta et al. |
| 2002/0007314 A1 | 1/2002 | Maruyama |
| 2002/0011990 A1 | 1/2002 | Anwar |
| 2002/0082942 A1 | 6/2002 | Shimazu |
| 2002/0094868 A1 | 7/2002 | Tuck et al. |
| 2003/0084034 A1 | 5/2003 | Fannin |
| 2003/0090530 A1 | 5/2003 | Ramani et al. |
| 2003/0103089 A1 | 6/2003 | Ramani et al. |
| 2004/0059708 A1 | 3/2004 | Dean et al. |
| 2004/0103093 A1 | 5/2004 | Furuhashi et al. |
| 2004/0167933 A1 | 8/2004 | Lomelin-Stoupignan et al. |
| 2004/0225968 A1 | 11/2004 | Look et al. |
| 2004/0248649 A1 | 12/2004 | Arai et al. |
| 2005/0038549 A1 | 2/2005 | Loughran |
| 2005/0071224 A1 | 3/2005 | Fikes et al. |
| 2005/0195157 A1 | 9/2005 | Kramer et al. |
| 2005/0198571 A1 | 9/2005 | Kramer et al. |
| 2005/0210380 A1 | 9/2005 | Kramer et al. |
| 2005/0278656 A1 | 12/2005 | Goldthwaite et al. |
| 2005/0289109 A1 | 12/2005 | Arrouye et al. |
| 2006/0036577 A1 | 2/2006 | Knighton et al. |
| 2006/0119618 A1 | 6/2006 | Knighton et al. |
| 2006/0190328 A1 | 8/2006 | Singh et al. |
| 2007/0070066 A1 | 3/2007 | Bakhash |
| 2007/0078706 A1 | 4/2007 | Datta et al. |
| 2007/0079331 A1 | 4/2007 | Datta et al. |
| 2007/0083408 A1 | 4/2007 | Altberg et al. |
| 2007/0124762 A1 | 5/2007 | Chickering et al. |
| 2007/0186178 A1 | 8/2007 | Schiller |
| 2007/0188488 A1 | 8/2007 | Choi |
| 2008/0016472 A1 | 1/2008 | Rohlf et al. |
| 2008/0024376 A1 | 1/2008 | Norris et al. |
| 2008/0040683 A1 | 2/2008 | Walsh |
| 2008/0071559 A1 | 3/2008 | Arrasvuori |
| 2008/0082417 A1 | 4/2008 | Publicover |
| 2008/0114751 A1 | 5/2008 | Cramer et al. |
| 2008/0120289 A1 | 5/2008 | Golan et al. |
| 2008/0162231 A1 | 7/2008 | Kahle et al. |
| 2008/0188969 A1 | 8/2008 | O'Malley et al. |
| 2008/0225007 A1 | 9/2008 | Nakadaira et al. |
| 2008/0243786 A1 | 10/2008 | Stading |
| 2008/0255937 A1 | 10/2008 | Chang et al. |
| 2009/0002523 A1 | 1/2009 | Maekawa |
| 2009/0007031 A1 | 1/2009 | Ginetti et al. |
| 2009/0030800 A1 | 1/2009 | Grois |
| 2009/0040225 A1 | 2/2009 | Wang et al. |
| 2009/0063983 A1 | 3/2009 | Amidon et al. |
| 2009/0070310 A1 | 3/2009 | Srivastava et al. |
| 2009/0094522 A1 | 4/2009 | Tu et al. |
| 2009/0112800 A1 | 4/2009 | Athsani |
| 2009/0112806 A1 | 4/2009 | Cheng et al. |
| 2009/0113349 A1 | 4/2009 | Zohar et al. |
| 2009/0119259 A1 | 5/2009 | Williams et al. |
| 2009/0132943 A1 | 5/2009 | Minsky et al. |
| 2009/0150210 A1 | 6/2009 | Athsani et al. |
| 2009/0157450 A1 | 6/2009 | Athsani et al. |
| 2009/0171728 A1 | 7/2009 | Yan et al. |
| 2009/0172727 A1 | 7/2009 | Baluja et al. |
| 2009/0187385 A1 | 7/2009 | Zegdoun et al. |
| 2009/0199229 A1 | 8/2009 | Gupta et al. |
| 2009/0237411 A1 | 9/2009 | Gossweiler et al. |
| 2009/0274391 A1 | 11/2009 | Arcas et al. |
| 2009/0276316 A1 | 11/2009 | Verma et al. |
| 2009/0281889 A1 | 11/2009 | Derosa-Grund |
| 2009/0299857 A1 | 12/2009 | Brubaker |
| 2010/0004995 A1 | 1/2010 | Hickman |
| 2010/0010959 A1 | 1/2010 | Broder et al. |
| 2010/0077329 A1 | 3/2010 | Korn |
| 2010/0085273 A1 | 4/2010 | Nakayama |
| 2010/0115428 A1 | 5/2010 | Shuping et al. |
| 2010/0169297 A1 | 7/2010 | Haveliwala et al. |
| 2010/0205035 A1 | 8/2010 | Baszucki et al. |
| 2010/0228636 A1 | 9/2010 | Silverman et al. |
| 2010/0248788 A1 | 9/2010 | Yook et al. |
| 2010/0283796 A1 | 11/2010 | Kramer et al. |
| 2010/0299199 A1 | 11/2010 | Kang |
| 2011/0013226 A1 | 1/2011 | Grosz et al. |
| 2011/0029884 A1 | 2/2011 | Grosz et al. |
| 2011/0099500 A1 | 4/2011 | Smith et al. |
| 2011/0106595 A1 | 5/2011 | Vande Velde |
| 2011/0106615 A1 | 5/2011 | Churchill et al. |
| 2011/0137727 A1 | 6/2011 | Chung et al. |
| 2011/0137753 A1 | 6/2011 | Moehrle |
| 2011/0178856 A1 | 7/2011 | Micaelian |
| 2011/0208575 A1 | 8/2011 | Bansal et al. |

(56) References Cited

U.S. PATENT DOCUMENTS

| | | |
|---|---|---|
| 2011/0208581 A1 | 8/2011 | Roebuck |
| 2011/0213655 A1 | 9/2011 | Henkin et al. |
| 2011/0218825 A1 | 9/2011 | Hertenstein |
| 2011/0258049 A1 | 10/2011 | Ramer et al. |
| 2011/0282742 A1 | 11/2011 | Umeda |
| 2011/0283226 A1 | 11/2011 | Basson et al. |
| 2011/0320441 A1 | 12/2011 | Lee et al. |
| 2012/0047025 A1 | 2/2012 | Strohman |
| 2012/0059722 A1 | 3/2012 | Rao |
| 2012/0084149 A1 | 4/2012 | Gaudiano et al. |
| 2012/0192115 A1 | 7/2012 | Falchuk et al. |
| 2012/0254792 A1 | 10/2012 | Husoy et al. |
| 2012/0259738 A1 | 10/2012 | Pillai |
| 2012/0268463 A1 | 10/2012 | Loberg |
| 2012/0287470 A1 | 11/2012 | Pettis |
| 2012/0290619 A1 | 11/2012 | Delise et al. |
| 2013/0018849 A1 | 1/2013 | Johnston et al. |
| 2013/0073374 A1 | 3/2013 | Heath |
| 2013/0073473 A1 | 3/2013 | Heath |
| 2013/0080264 A1 | 3/2013 | Umeda |
| 2013/0096708 A1 | 4/2013 | Danks |
| 2013/0124311 A1 | 5/2013 | Sivanandan et al. |
| 2013/0144720 A1 | 6/2013 | Hari et al. |
| 2013/0179698 A1 | 7/2013 | Woods et al. |
| 2013/0212108 A1 | 8/2013 | Armon-Kest et al. |
| 2013/0222373 A1 | 8/2013 | Weinstein et al. |
| 2013/0226699 A1 | 8/2013 | Long |
| 2013/0268871 A1 | 10/2013 | Webb et al. |
| 2013/0304604 A1* | 11/2013 | Hoffman ............ G06Q 30/0621 705/26.5 |
| 2013/0305287 A1 | 11/2013 | Wong et al. |
| 2013/0311273 A1 | 11/2013 | Huang |
| 2013/0311308 A1 | 11/2013 | Huang |
| 2014/0022248 A1 | 1/2014 | Kuffner et al. |
| 2014/0033250 A1 | 1/2014 | Kennedy |
| 2014/0037218 A1 | 2/2014 | Zweig et al. |
| 2014/0052563 A1 | 2/2014 | Watkins et al. |
| 2014/0095122 A1 | 4/2014 | Appleman et al. |
| 2014/0122579 A1 | 5/2014 | Friefeld et al. |
| 2014/0129393 A1 | 5/2014 | Soon-Shiong |
| 2014/0288699 A1 | 9/2014 | Williams et al. |
| 2014/0309765 A1 | 10/2014 | Blanchfield, Jr. |
| 2014/0316546 A1 | 10/2014 | Walsh et al. |
| 2014/0330649 A1 | 11/2014 | Lyren et al. |
| 2015/0120806 A1 | 4/2015 | Lippincott |
| 2015/0161823 A1 | 6/2015 | Anderson-Sprecher et al. |
| 2015/0165692 A1 | 6/2015 | Morrow et al. |
| 2015/0172773 A1 | 6/2015 | Klappert et al. |
| 2015/0221053 A1 | 8/2015 | Tapley et al. |
| 2015/0224715 A1 | 8/2015 | Badhani et al. |
| 2015/0310520 A1 | 10/2015 | Donato et al. |
| 2015/0324840 A1 | 11/2015 | Ramnath Krishnan |
| 2016/0078662 A1 | 3/2016 | Herman et al. |
| 2016/0092935 A1 | 3/2016 | Bradley et al. |
| 2016/0140119 A1 | 5/2016 | Ishii |

OTHER PUBLICATIONS

Chen et al., "On Visual Similarity Based 3D Model Retrieval," Eurographics, vol. 22, No. 3, 2003, 10 pages.

Daras et al., "A 3D Shape Retrieval Framework Supporting Multimodal Queries," Int J Comput Vis, vol. 89, 2010, pp. 229-247.

Funkhouser et al., "A Search Engine for 3D Models", ACM Transactions on Graphics, vol. V, No. N, 2003, 28 pages.

Google, "Advanced 3D Warehouse search in SketchUp 7," SketchUpdate, Jan. 23, 2009, retrieved from http://sketchupdate.bogspot.com/2009/01/advanced-3d-warehouse-search-in.html on Oct. 27, 2014.

Rodgers Shelly et al. The Interactive Advertising Model: How Users Perceived and Process Online Ads, Journal of Interactive Advertising, vol. 1 No. 1 (Fall 2000), pp. 42-61.

U.S. Notice of Allowance on U.S. Appl. No. 14/280,092 dated Jul. 25, 2017.

U.S. Office Action on U.S. Appl. No. 13/433,240 dated Apr. 27, 2016.

U.S. Office Action on U.S. Appl. No. 13/433,240 dated Jan. 24, 2014.

U.S. Office Action on U.S. Appl. No. 13/433,240 dated Jul. 2, 2015.

U.S. Office Action on U.S. Appl. No. 13/433,240 dated Nov. 26, 2014.

U.S. Office Action on U.S. Appl. No. 13/433,240 dated Sep. 26, 2013.

U.S. Office Action on U.S. Appl. No. 13/433,240 dated Oct. 19, 2016.

U.S. Office Action on U.S. Appl. No. 14/280,092 dated Jan. 26, 2017.

U.S. Office Action on U.S. Appl. No. 14/280,092 dated May 9, 2016.

U.S. Office Action on U.S. Appl. No. 14/280,092 dated Sep. 14, 2016.

Vasilakis et al., "A Semantic Based Search Engine for 3D Shapes: Design and Early Prototype Implementation," 2005, 6 pages.

Visible Body—3D Human Anatomy, Mar. 28, 2012, retrieved from http://www.visiblebody.com.

Non-Final Office Action on U.S. Appl. No. 16/568,035 dated Oct. 4, 2019 (25 pages).

* cited by examiner

METHOD AND SYSTEM FOR 3-D PRINTING OF 3-D OBJECT MODELS IN INTERACTIVE CONTENT ITEMS

CROSS-REFERENCE TO RELATED PATENT APPLICATION

The present application is a continuation of and claims priority to U.S. patent application Ser. No. 14/280,092, entitled "METHOD AND SYSTEM FOR 3-D PRINTING OF 3-D OBJECT MODELS IN INTERACTIVE CONTENT ITEMS", filed May 16, 2014, which is incorporated herein by reference in its entirety.

BACKGROUND

The present disclosure relates generally to the field of content items provided to electronic devices through a communications network.

SUMMARY

Online shopping has gained significant attraction from a large number of consumers. However, many other consumers still feel the need for the experience to touch and feel a product before making a decision to buy. For such consumers, digital online content provided through advertisement content or on web sites of sellers is not sufficient to trigger them to buy sellers' products. In order to overcome such a problem, apparatuses, and methods for enabling 3-D printing of 3-D prototypes of objects associated with interactive content items are presented.

According to at least one illustrative implementation, an apparatus comprises a processor and a memory with computer code instructions stored thereon. The processor and the memory, with the computer code instructions stored thereon, are configured to cause the apparatus to provide, to a client device, an interactive content item including a representation of a three-dimensional (3-D) object. An end user of the client device interacts with the interactive content item and provides one or more customization parameters for a 3-D representation of the 3-D object. The apparatus receives the one or more customization parameters from the client device. The apparatus then causes a 3-D representation of the 3-D object to be printed by a 3-D printer associated with the client device.

According to at least one illustrative implementation, a method of enabling customization and 3-D prototyping of a 3-D representation of an object illustrated by an interactive content item comprises providing, by a computer server, an interactive content item including a representation of a three-dimensional (3-D) object to a client device. An end user of the client device interacts with the interactive content item and provides one or more customization parameters for a 3-D representation of the 3-D object. The computer server receives the one or more customization parameters from the client device. The computer server then causes a 3-D representation of the 3-D object to be printed by a 3-D printer associated with the client device.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Specific implementations and applications are provided primarily for illustrative purposes.

A computing device, e.g., a client device, allows accessing and rendering a resource, such as a webpage, a document, an application, etc. In some implementations, the computing device accesses the resource, via the Internet by communicating with a server, such as a webpage server, corresponding to that resource. The resource includes first-party content that is the subject of the resource from a first-party content provider and may also include additional third-party provided content, such as advertisements or other content. In an illustrative implementation, responsive to receiving a request to access a webpage, a webpage server and/or a client device communicates with a data processing system, such as a content item selection system, to request a content item to be presented with the requested webpage. This may be done through the execution of a code included in the resource that requests a third-party content item to be presented with the resource. The content item selection system may select a third-party content item and provide data to effect presentation of the content item with the requested webpage on a display of the client device. In some instances, the content item is selected and served with a resource associated with a search query response. A search engine may return search results on a search results webpage and includes third-party content items related to the search query in one or more content item slots of the search results webpage.

The computing device, e.g., a client device, may also be used to view or execute an application, such as a mobile application. The application may include first-party content that is the subject of the application from a first-party content provider and additional third-party provided content, such as advertisements or other content. In an illustrative implementation, responsive to use of the application, a resource server and/or a client device communicates with a data processing system, such as a content item selection system, to request a content item to be presented with a user interface of the application and/or otherwise. The content item selection system selects a third-party content item and provides data to effect presentation of the content item with the application on a display of the client device.

In some instances, a device identifier is associated with the client device. The device identifier may be a randomized number associated with the client device to identify the device during subsequent requests for resources and/or content items. In some instances, the device identifier is configured to store, and/or cause the client device to transmit to the content item selection system and/or resource server, information related to the client device, e.g., values of sensor data, a web browser type, an operating system, historical resource requests, historical content item requests, hardware/software capabilities associated with the client device, or combinations such information related to the client device.

In situations in which the systems discussed here collect personal information about users, or makes use of personal information, the users may be provided with an opportunity to control whether programs or features collect user information, e.g., information about a user's social network, social actions or activities, profession, a user's preferences, or a user's current location. The users may control whether and/or how to receive content from the content server that is more relevant to the user. In addition, certain data may be treated in one or more ways before it is stored or used, so that personally identifiable information is removed. A user's identity may be treated in a way that no personally identifiable information of the user is revealed. According to another implementation, information indicative of a user's geographic location, such as to a city, ZIP code, or state level, is generalized so that a particular location of a user is not uncovered. Thus, the user may have control over how information is collected about the user and used by a content server or a content item selection system.

According to an illustrative implementation, a third-party content provider, when providing third-party content items for presentation with requested resources via the Internet or other network, utilizes a content item management service to control or otherwise influence the selection and serving of the third-party content items. For instance, a third-party content provider may specify selection criteria, such as keywords, and corresponding bid values that are used in the selection of the third-party content items. The bid values may be utilized by the content item selection system in an auction to select and serve content items for presentation with a resource. A third-party content provider may place a bid in the auction that corresponds to an agreement to pay a certain amount of money if a user interacts with the provider's content item, e.g., the provider agrees to pay $3 if a user clicks on the provider's content item. In other implementations, a third-party content provider places a bid in the auction that corresponds to an agreement to pay a certain amount of money if the content item is selected and served, e.g., the provider agrees to pay $0.005 each time a content item is selected and served or the provider agrees to pay $0.05 each time a content item is selected or clicked. In some instances, the content item selection system uses content item interaction data to determine the performance of the third-party content provider's content items. Users may be more inclined to click on third-party content items on certain webpages over others. Accordingly, auction bids to place the third-party content items may be relatively high for high-performing webpages, categories of webpages, and/or other criteria, while the bids may be relatively low for low-performing webpages, categories of webpages, and/or other criteria.

In some instances, one or more performance metrics for the third-party content items are determined and indications of such performance metrics are provided to the third-party content provider via a user interface for the content item management account. The performance metrics may include a cost per impression (CPI) or cost per thousand impressions (CPM). An impression may be counted whenever a content item is selected to be served for presentation with a resource. In some instances, the performance metric includes a click-through rate (CTR), defined as the number of clicks on the content item divided by the number of impressions. Other performance metrics may include cost per action (CPA), conversion rate (CVR), cost per click-through (CPC), cost per sale (CPS), cost per lead (CPL), effective CPM (eCPM), and/or other performance metrics. When employing CPA, an action may include clicking on the content item or a link therein, a purchase of a product, a referral of the content item, or the like. When using CPC, a click-through is counted when a content item is clicked.

In some instances, a webpage or other resource, such as, an application, includes one or more content item slots in which a selected and served third-party content item is displayed. A computer code, e.g., JavaScript®, HTML, etc., defining a content item slot for a webpage or other resource includes instructions to request a third-party content item from the content item selection system to be presented with the resource. In some implementations, the code includes an image request having a content item request uniform resource locator (URL) that includes one or more parameters, e.g., /page/contentitem?devid=abc123&devnfo=A34r0. Such parameters, in some implementations, are encoded strings such as "devid=abc123" and/or "devnfo=A34r0."

According to at least one illustrative implementation, the selection of a third-party content item to be served with the resource by a content item selection system is based on several influencing factors, such as a predicted click through rate (pCTR), a predicted conversion rate (pCVR), a bid associated with the content item, etc. Such influencing factors may be used to generate a value, such as a score, against which other scores for other content items are compared by the content item selection system through an auction.

During an auction for a content item slot for a resource, such as a webpage, several different types of bid values may be utilized by third-party content providers for various third-party content items. An auction may include bids based on whether a user clicks on the third-party content item, whether a user performs a specific action based on the presentation of the third-party content item, whether the third-party content item is selected and served, and/or other types of bids. According to an illustrative implementation, a bid based on whether the third-party content item is selected and served is a relatively low bid, e.g., $0.005, while a bid based on whether a user performs a specific action is a relatively high bid, e.g., $5. In some instances, the bid is adjusted to account for a probability associated with the type of bid and/or adjusted for other reasons. The probability of the user performing the specific action may be low, such as 0.2%, while the probability of selecting and serving the third-party content item may be 100%, e.g., the selecting and serving of the content item occurs when the content item is selected during the auction, and, as such, the bid is unadjusted. Accordingly, a value, such as a score or a normalized value, is generated to be used in the auction based on the bid value and the probability or another modifying value. In the prior implementation, the value or score for a bid based on whether the third-party content item is selected and served may be $0.005*1.00=0.005 and the value or score for a bid based on whether a user performs a specific action may be $5×0.002=0.01. In order to maximize the income generated, the content item selection system may select the third-party content item with the highest value from the auction. In the foregoing implementation, the content item selection system may select the content item associated with the bid based on whether the user performs the specific action due to the higher value or score associated with that bid. Once a third-party content item is selected by the content item selection system, data to effect presentation of the third-party content item on a display of the client device is provided to the client device using a network.

On any given day, a large number of users access online content through data services provided on their client devices. As such, online advertisement has become an important advertisement platform for many retailers, manufacturers, service providers, advertisers, and/or the like. Also, on-line shopping has become a wide practice among a substantial number of consumers. While online shopping is less time consuming for consumers and allows for fast and easy price and product checking across different merchants, online shoppers are deprived from the haptic information, or touch, experience. According to some industry statistics, about 82% of people agree that it is important to touch, feel, and assess tangible items before a purchase. Haptic information processing significantly influences purchasing decisions by tapping into sensory and emotional motivators. Some consumers are likely to become frustrated by their inability to acquire this information, causing them to forgo certain non-touch shopping environments, e.g., online shopping. Many shoppers browse merchandise online, but buy in stores. Such phenomenon puts online-only merchants at disadvantage. Also, even merchants having physical store(s) close to their potential customers look forward to increase their online transactions with their customers. For merchants, selling online is less costly and allows easier management of inventory and labor force than traditional selling.

According to at least one aspect, interactive content items are delivered to client devices of end users through a communications network. On a client device receiving an interactive content item, media content associated with the received interactive content item is displayed. The received interactive content item and the client device provide interactive tools enabling the end user to customize a three-dimensional (3-D) representation of an object illustrated in the displayed media content. The received interactive content item and the client device may also provide interactive tools for causing the customized 3-D representation of the object to be 3-D printed through a 3-D prototyping device coupled to the client device. With a 3-D prototype at hand, the end-user has the chance to get a touch, or feel, experience, in relation with the printed 3-D prototype. In some implementations, the interactive content item may be an advertisement content item and the object illustrated in the displayed media content may be an advertised object. In some implementations, the interactive content is provided, e.g., as demo item, on a merchant web page. The interactive content item is accessed and customized through the merchant web page. In some implementations, a non-customized 3-D representation of the object is 3-D printed.

While the foregoing has provided an overview of customizing and 3-D printing of 3-D representations of objects associated with interactive content items, illustrative implementations of a system, methods, and apparatuses for delivering interactive content items and enabling customization and 3-D prototyping of 3-D representations of objects associated with the interactive content items are will now be described in reference to FIGS. 1-3.

Figure 1A:
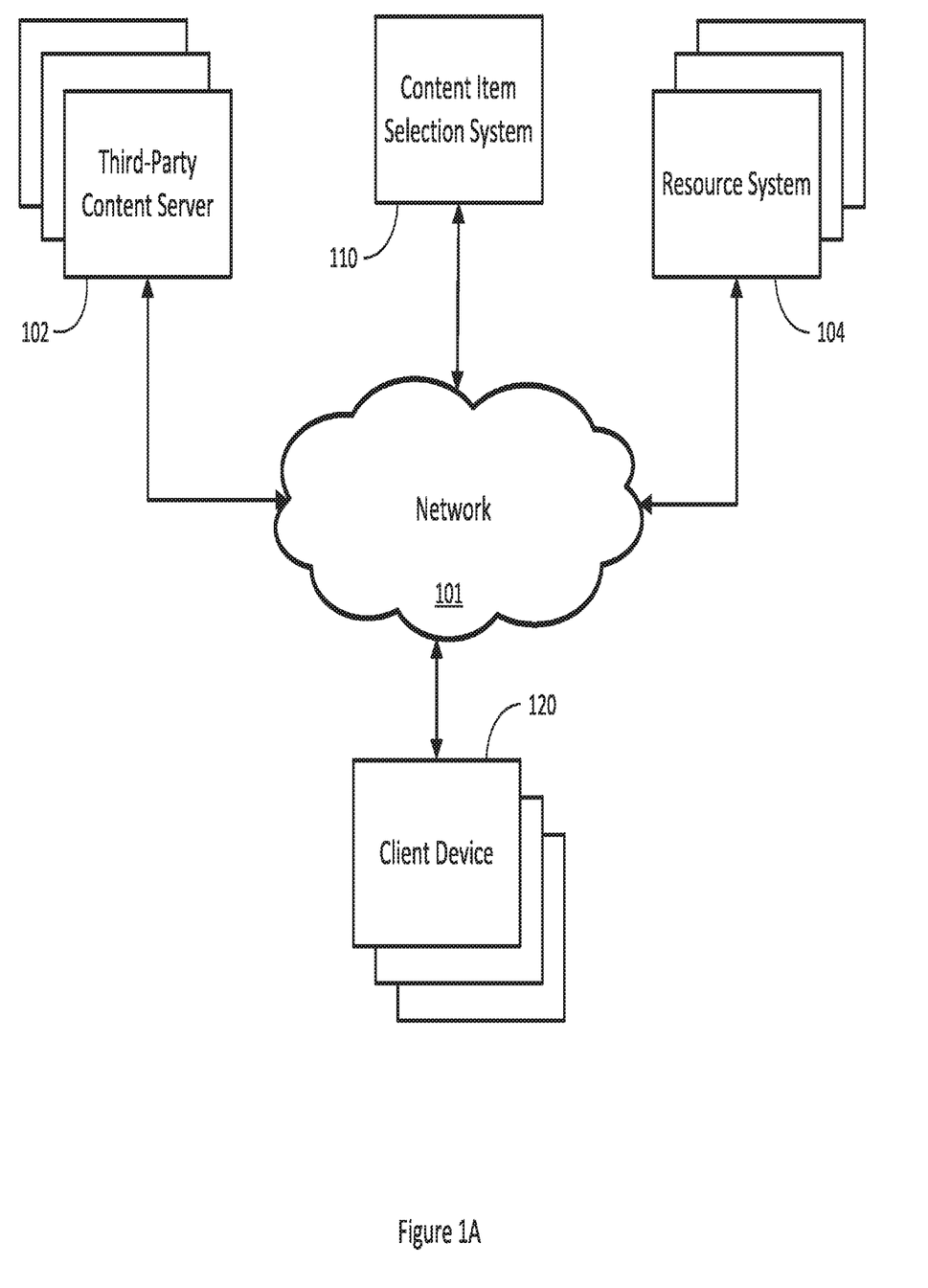
FIG. 1A is a block diagram of an illustrative implementation of a system for delivering content items, including interactive content items, via at least one communications network.

FIG. 1A is a block diagram of an illustrative implementation of a system 100 for delivering content items, including interactive content items, via at least one communications network such as the network 101. The network 101 includes a local area network (LAN), wide area network (WAN), a telephone network, such as the Public Switched Telephone Network (PSTN), a wireless link, an intranet, the Internet, or combinations thereof. The system 100 also includes at least one data processing system, such as a content item selection system 110. The content item selection system 110 includes at least one logic device, such as a computing device having a data processor, to communicate via the network 101 with a resource server 104, a client device 120, and/or a third-party content server 102. The content item selection system 110 includes one or more data processors, such as a content placement processor, configured to execute instructions stored in a memory device to perform one or more operations described herein. In other words, the one or more data processors and the memory device of the content item selection system 110 form a processing module. The processor includes a microprocessor, an application-specific integrated circuit (ASIC), a field-programmable gate array (FPGA), etc., or combinations thereof.

The memory includes, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C #, Java®, JavaScript®, Perl®, HTML, XML, Python®, Visual Basic®, the like, or combinations thereof. The processor processes instructions and outputs data to effect presentation of one or more content items to the resource server 104 and/or the client device 110. In addition to the one or more processors, the content item selection system 110 may further include one or more databases configured to store data. The content item selection system 110 also includes an interface configured to receive data via the network 101 and to provide data from the content item selection system 110 to any of the other devices coupled to the network 101. The content item selection system 110 may include a server, such as an advertisement server or the like.

The client device 120 may include one or more devices such as a computer, laptop, desktop, smart phone, tablet, personal digital assistant, set-top box for a television set, a smart television, server device configured to communicate with other devices via the network 101, or the like. The client device 120 may be any form of portable electronic device that includes a data processor and a memory. The memory may store machine instructions that, when executed by a processor, cause the client device to perform one or more of the operations described herein. The memory may also store data to effect presentation of one or more resources, content items, etc., on the client device 120. The processor may include a microprocessor, an application-specific integrated circuit (ASIC), a field-programmable gate array (FPGA), etc., or combinations thereof. The memory includes, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ctionScript®, C, C++, C #, HTML, Java®, JavaScript®, Perl®, Python®, Visual Basic®, XML, the like, or combinations thereof.

According to at least one illustrative implementation, the client device 120 is configured to execute a software application, e.g., a web browser or other application, to retrieve content from other computing devices over the network 101. Such an application may be configured to retrieve first-party content from a resource server 104. In some instances, an application running on the client device 120 may itself be first-party content, e.g., a game, a media player, etc. According to at least one illustrative implementation, the client device 120 executes a web browser application which provides a browser window on a display of the client device. The web browser application that provides the browser window operates by receiving input of a uniform resource locator (URL), such as a web address, from an input device, e.g., a pointing device, a keyboard, a touch screen, or another form of input device. In response, one or more processors of the client device executing instructions from the web browser application request data from another device, e.g., a resource server 104, connected to the network 110 referred and associated with the URL address. The other device then provides web page data and/or other data to the client device 120, which causes visual indicia to be displayed by the display of the client device 120. Accordingly, the browser window displays the retrieved first-party content, such as web pages from various websites, to facilitate user interaction with the first-party content.

The resource server 104 may include a computing device, such as a server, configured to host a resource, such as a web page or other resource, e.g., articles, comment threads, music, video, graphics, search results, information feeds, application, etc. According to at least one illustrative implementation, the resource server 104 is a computer server, e.g., a file transfer protocol (FTP) server, file sharing server, web server, etc., or a combination of servers, e.g., a data center, a cloud computing platform, etc. The resource server 104 is configured to provide resource data or other content, e.g., text documents, PDF files, and other forms of electronic documents, to the client device 120. According to at least one illustrative implementation, the client device 120 accesses the resource server 104 via the network 101 to request data to effect presentation of a resource of the resource server 104.

The system 100 includes one or more third-party content servers 102, associated with one or more third-party content providers, to directly or indirectly provide data for third-party content items to the content item selection system 110 and/or to other computing devices via the network 101. The content items may be in any format that may be presented on a display of a client device 120, such as graphical, text, image, audio, video, etc. A content item may also be in a combination (hybrid) of the formats. The content items may be banner content items, interstitial content items, pop-up content items, rich media content items, hybrid content items, Flash® content items, cross-domain I-frame content items, the like, or combinations thereof. The content items may also include embedded information such as hyperlinks, metadata, links, machine-executable instructions, annotations, etc. In some instances, the third-party content servers 102 is integrated into the content item selection system 110 and/or the data representative of the third-party content items is stored in a database of the content item selection system 110.

According to at least one illustrative implementation, the content item selection system 110 receives, via the network 101, a request for a content item to present with a resource. The received request may be received from a resource server 104, a client device 120, and/or any other computing device coupled to the network 101. The resource server 104 may be owned or ran by a first-party content provider, and may instruct the content item selection system 110 to provide third-party content items with one or more resources, e.g., web pages, applications, or the like, of the first-party content provider on the resource server 104.

When accessing a resource of the resource server 104, the client device 120 may, for instance, make a request to the content item selection system 110 for content items to be presented with the resource.

According to at least one illustrative implementation, the content item request includes requesting device information, e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, software/hardware capabilities of the requesting device, etc., and resource information, e.g., URL of the requested resource, one or more keywords of the content of the requested resource, text of the content of the resource, a title of the resource, a category of the resource, a type of the resource, etc. The information received by the content item selection system 110 may include a HyperText Transfer Protocol (HTTP) cookie which contains a device identifier, e.g., a random number, that represents the client device 110. In some implementations, the device information and/or the resource information is appended to a content item URL, e.g., contentitem.item/page/contentitem?devid=abc123&devnfo=A34r0. In other implementations, the device information and/or the resource information is encoded prior to being appended to the content item URL. The requesting device information and/or the resource information may be utilized by the content item selection system 110 to select third-party content items to be served with the requested resource and presented on a display of a client device 120.

In some instances, a resource of a resource server 104 includes a search engine feature. The search engine feature receives a search query, e.g., a string of text, via an input feature, e.g., an input text box, etc. In response, the search engine searches an index of documents associated with resources, such as web pages, applications, images, etc., for relevant search results based on the search query. The search results are then transmitted as a second resource, such as a search result web page, used to present the relevant search results on a display of a client device 120. The search results may include web page titles, hyperlinks, etc. According to at least one illustrative implementation, one or more third-party content items are presented with the search results in a content item slot of the search result web page. Accordingly, the resource server 104 and/or the client device 120 may request one or more content items from the content item selection system 110 to be presented in the content item slot of the search result web page. The content item request may include additional information, such as the user device information, the resource information, a quantity of content items, a format for the content items, the search query string, keywords of the search query string, information related to the query, e.g., geographic location information, temporal information, content type information, etc. In some implementations, a delineation is made between the search results and the third-party content items to avert confusion.

In some implementations, the third-party content provider manages the selection and serving of content items by content item selection system 110. The third-party content provider may set bid values and/or selection criteria via a user interface that may include one or more content item conditions or constraints regarding the serving of content items. A third-party content provider may specify that a content item and/or a set of content items are selected and served for user devices 120 having device identifiers associated with a certain geographic location or region, a certain language, a certain operating system, a certain web browser, certain hardware/software capabilities, certain printing or prototyping devices, etc. In another implementation, the third-party content provider may specify that a content item or set of content items are selected and served when the resource, such as a web page, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Figure 1B:
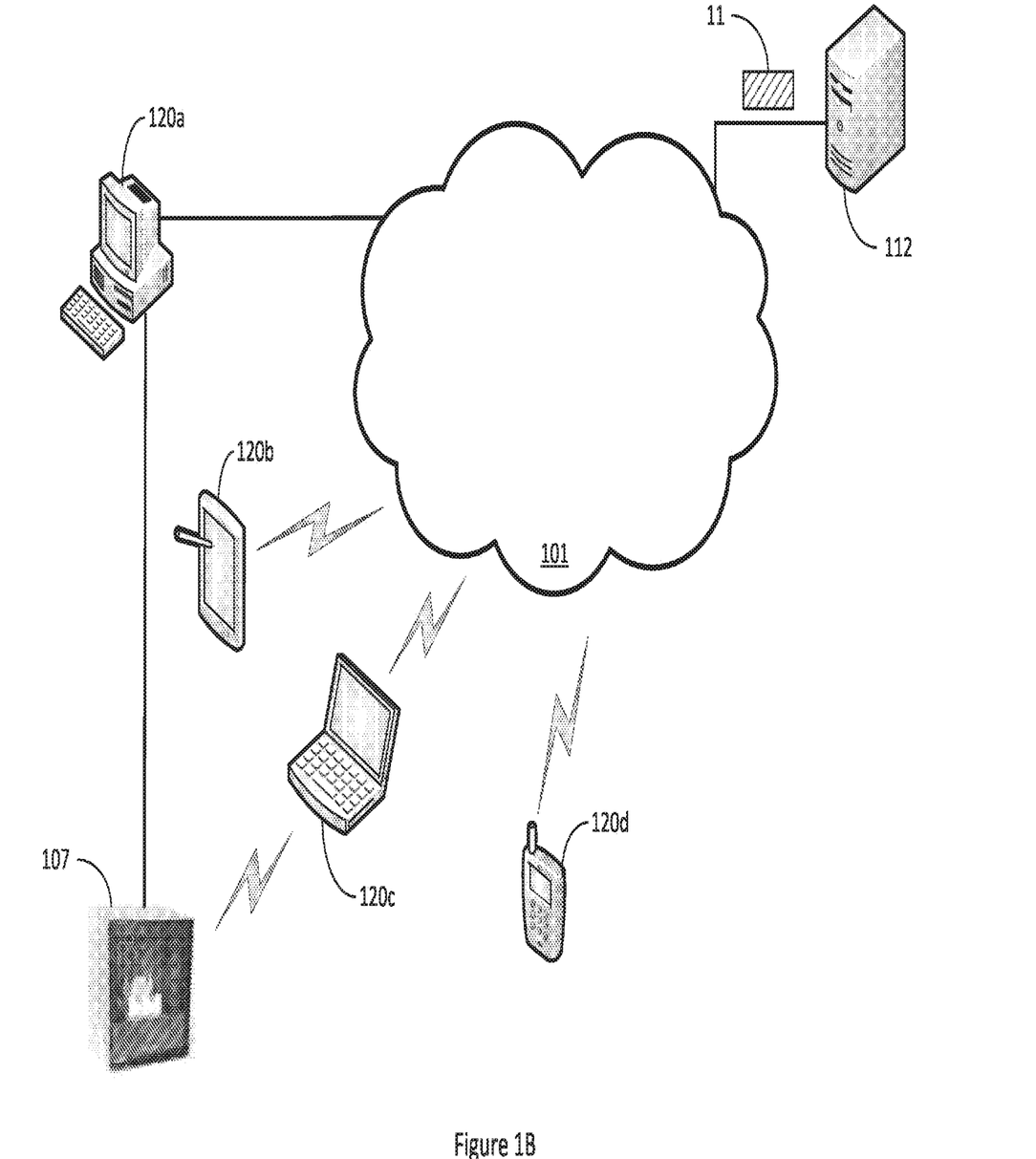
FIG. 1B is a diagram illustrating another illustrative implementation of the system for delivering content items to client devices.

FIG. 1B is a diagram illustrating another illustrative implementation of the system 100 for delivering content items to client devices. A computer server 112, e.g., a third-party content server 102, a resource server 104, or a server associated with the content item selection system 110, has access to a plurality of interaction content items, e.g., advertisement content items or the like, and is configured to select and provide interactive content items to a client devices, e.g., 120a-120d, through the network 101. The client devices 120a-120d, also referred to either individually or collectively as client device(s) 120, may be couple to the network 101 through wired and/or wireless communications links. A client device 120 may be coupled to a 3-D printer 107 through wired and/or wireless communications links.

According to at least one illustrative implementation, the computer server 112 detects a request for resource originating at a client device 120 and, in response, selects an interactive content item enabling customization and 3-D printing of a representation of an object associated with the selected interactive content item. The selection of the interactive content item may be performed based on one or more criteria associated with information related to the requested resource, information related to the requesting client device 120, information related to the end user of the requesting client device, other information, or a combination thereof. For instance, the computer server 112 may acquire information indicative of whether or not a 3-D printer 107 is coupled to the requesting client device 120 and decide whether or not to provide an interactive content item allowing 3-D printing based on the acquired information. The information acquired by the computer server may further include information indicative of settings of the 3-D printer 107 if such printer is coupled to the requesting client device 120. Once an interactive content item is selected, the computer server 112 sends data 11 representative of the interactive content item to the requesting client device 120 either directly or through one or more other severs.

Figure 2:
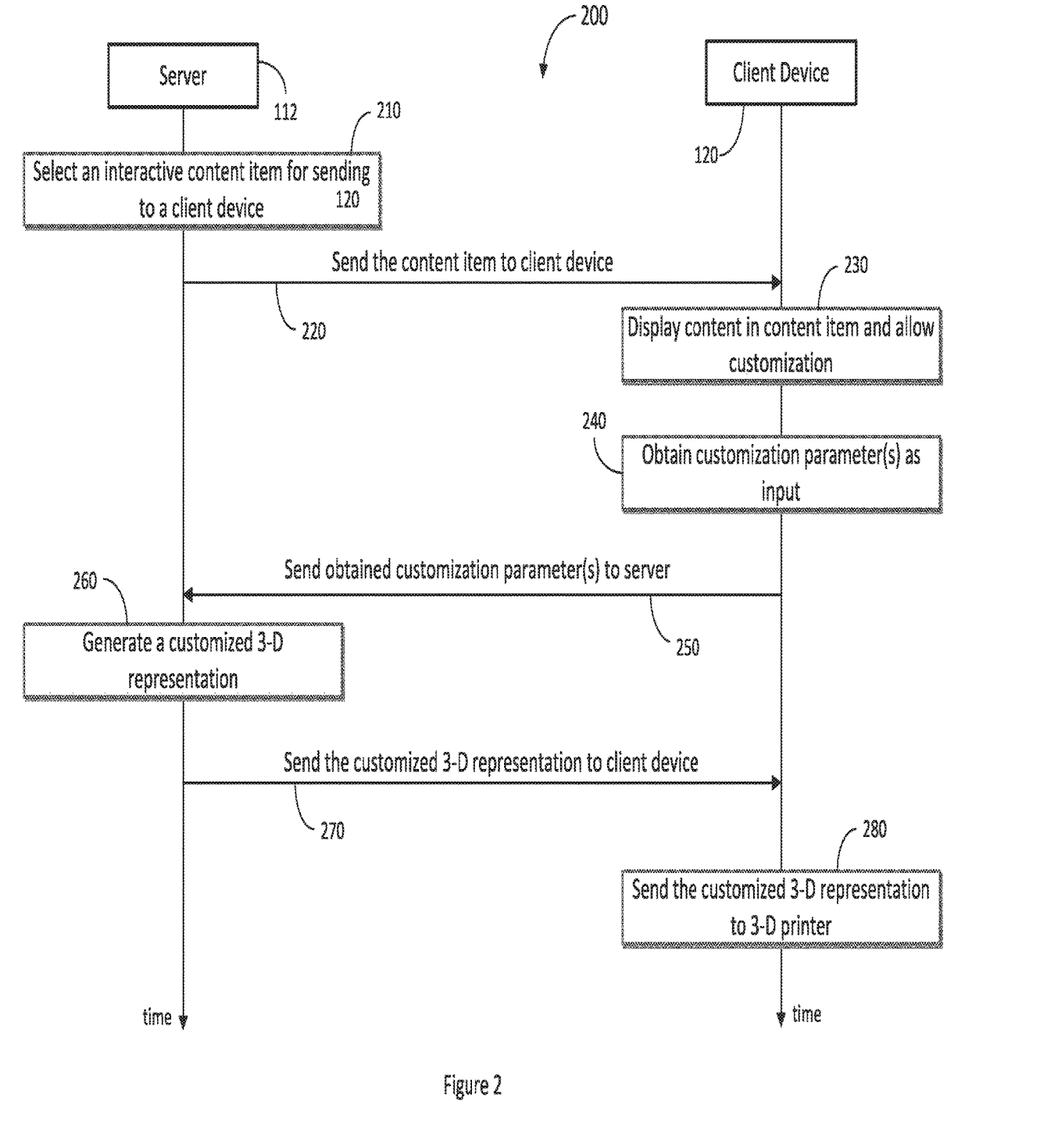
FIG. 2 is a flowchart illustrating an illustrative implementation of a method of enabling customization and 3-D prototyping of a 3-D representation of an object associated with an interactive content item.

FIG. 2 is a flowchart illustrating an illustrative implementation of a method of enabling customization and 3-D prototyping of a 3-D representation of an object associated with an interactive content item. The computer server 112 selects 210 an interactive content item, among a plurality of interactive content items, for providing to a client device 120. According to at least one illustrative implementation, the selection of the interactive content item is based on a context associated with the interactive content item, context associated with a resource requested by the client device, information associated with the client device 120, information associated with the end user of the client device 120, the like, or combinations thereof. For a given content item, or given resource, context herein refers to information indicative of one or more related subjects, one or more related products, one or more related locations, one or more entities, the like, or combinations thereof.

Upon detecting a request from the client device 120 for a resource, the computer server 112 may perform one or more checks to determine an interactive content item for providing to the client device 120 with the requested resource. For instance, the computer server 112 may check a context associated with the requested resource and select one or more interactive content items with a similar context. The computer server 112 may, alternatively or in addition, use end user information, e.g., previous resources requested and accessed by end user, previous content items consumed by end user, social network profile information, the like, or combinations thereof, in selecting an interactive content item suitable for the end user. The end user information may be provided to the computer server 112 through the request for the resource or may be available through other means, e.g., previously collected and stored in a database, to the computer server 112. In other instances, the computer server 112, further or alternatively, uses information associated with the client device 120 in selecting an interactive content item. When selecting an interactive content item for sending to the client device 120, the computer server 112 may take into account software/hardware capabilities of the client device 120, e.g., type and/or version of browser application, 3-D printing capability, etc. According to an illustrative implementation, interactive content items allowing customization and 3-D printing 3-D representations of objects are selected to be sent only to client devices coupled to 3-D printers. Alternatively, such interactive content items are sent to client devices 120 regardless of their capabilities. Information associated with the client device 120 may be embedded in the resource request or may be available to the computer server 112 through other means.

The computer server 112 sends 220 the selected interactive content item to the client device 120. According to at least one illustrative implementation, the interactive content item includes media content for displaying on the client device 120 and a user interaction module for enabling interaction with the end user of the client device 120. In particular, the user interaction module is configured to provide textual content, interaction widgets, and/or other web objects to engage the end user, and obtain end user's response. The media content and the interaction content may be displayed within a window associated with the browser application, a game application, a weblet, or the like.

Upon receiving the interactive content item, the client device 120 displays 230 media content and interaction content, associated with the interactive content item, to the corresponding end user. According to at least one illustrative implementation, the client device 120 displays 230 the media content within a web page requested by the client device 120. The media content, e.g., video, image(s), animation content, and/or the like includes a representation of an object. For instance, the interactive content item is an advertisement content advertising sunglasses, and the corresponding media content includes images, animation, or a video sequence illustrating sunglasses of a particular advertised brand. In other instances, the interactive content item is an advertisement content advertising jewelry, and the corresponding media content includes images, animation, or a video sequence illustrating rings, necklaces, or bracelets associated with a particular jewelry retailer. A person skilled in the art should appreciate that the media content illustrating the object therein may be textual content, 2-D media content, 3-D media content, or a combination thereof.

The interaction module of the interactive content item causes interaction content, e.g., interaction widget(s), media object(s), and/or textual content, to be displayed on the client device 120, therefore allowing 230 customization of a 3-D representation of the illustrated object. An icon may be displayed in relation to the displayed media content enabling the user to initiate customization of the 3-D representation of the illustrated 3-D object. Selection tabs, e.g., associated with different features or models of the illustrated object, one or more text boxes, other interaction tools, or combinations thereof are provided through a input/output (I/O) modules of the client device 120 to the end user. Using the interaction tools, the end user may choose to customizes a representation of the illustrated object by specifying a model, a color, one or more size parameters, one or more shape parameters, or other customization parameters associated with the illustrated object. In some implementations, the interaction content includes a request to the end user to specify whether or not a 3-D prototyping device 107 is available to the client device 120. In such case, 3-D printing may be allowed or not based on the end user's response.

Upon specifying one or more customization parameters by the end user, the interactive content item, or a browser application, obtains 240 the specified customization parameters through input modules, e.g., a touch screen, keyboard, mouse device, the like, or combinations thereof, of the client device 120. According to at least one implementation, the customized representation is displayed on a display of the client device 120 for viewing by the end user. Alternatively, the customized representation may not be displayed to the end user.

The interactive content item, or the browser application, causes the obtained customization parameters to be sent 250 to the computer server 112 through a communications interface of the client device 120 and the network 101. The obtained customization parameter(s) may be sent to the computer server 112 within a request for a corresponding 3-D representation, or model, corresponding to the obtained customization parameter(s). According to at least one illustrative implementation, the interactive content item does not include 3-D representations corresponding to potential customization choices of the illustrated object, and is not configured to generate such 3-D representations. In other words, the interactive content item is designed to be light in terms of memory consumption and computational complexity.

Upon receiving the customization parameter(s), the computer server 112 generates 260 a customized 3-D representation of the illustrated object based on the received customization parameter(s). Generating the customized 3-D representation includes constructing a 3-D representation based on the received customization parameter(s) or retrieving a 3-D representation corresponding to the received customization parameter(a) from a database with, or external to, the computer server 112. In generating the customized 3-D representation, settings of the 3-D printer 107 may be taken into consideration. The resolution, the color set, or other features of the generated 3-D representation may be set based on corresponding settings' parameters of the 3-D printer 107. The computer server 112 then sends 270 the generated 3-D representation to the client device 120 for forwarding to a 3-D printer 107 coupled to the client device 120.

Upon receiving the generated 3-D representation, the client device 120 may send 280 the received 3-D representation to the 3-D printer 107 for 3-D printing. According to an illustrative implementation, the interactive content item provides, through the display of the client device 120, an interactive widget, e.g., tab or icon, allowing the end user to initiate 3-D printing of the customized representation of the object. For instance, the interactive widget is provided after receiving the 3-D representation from the computer server, and in response to the end user interacting with the interactive widget, the client device 120 sends 280 the received 3-D representation to the 3-D printer 107 for 3-D printing. In another instance, the interaction widget is provided after customization parameters are obtained by the interactive content item or the browser application, and in response, the interactive content item or the browser application sends 250 the obtained customization parameter(s) to the computer server 112 requesting a corresponding 3-D representation of the object. According to yet another instance, the interaction widget is provided after receipt 220 of the interaction content item and is used to initiate customization and 3-D printing all together. In the last two instances, the 3-D representation is forwarded 280 directly to the 3-D printer 107 upon receipt from the computer server 112.

The client device 120 may further send feedback information to the computer server 112. The feedback information may include indication(s) of whether or not the end user interacted with the interaction content item, whether or not a 3-D representation was 3-D printed, other information, or combinations thereof. Sending the feedback information to computer server 112 may be optional.

Figure 3:
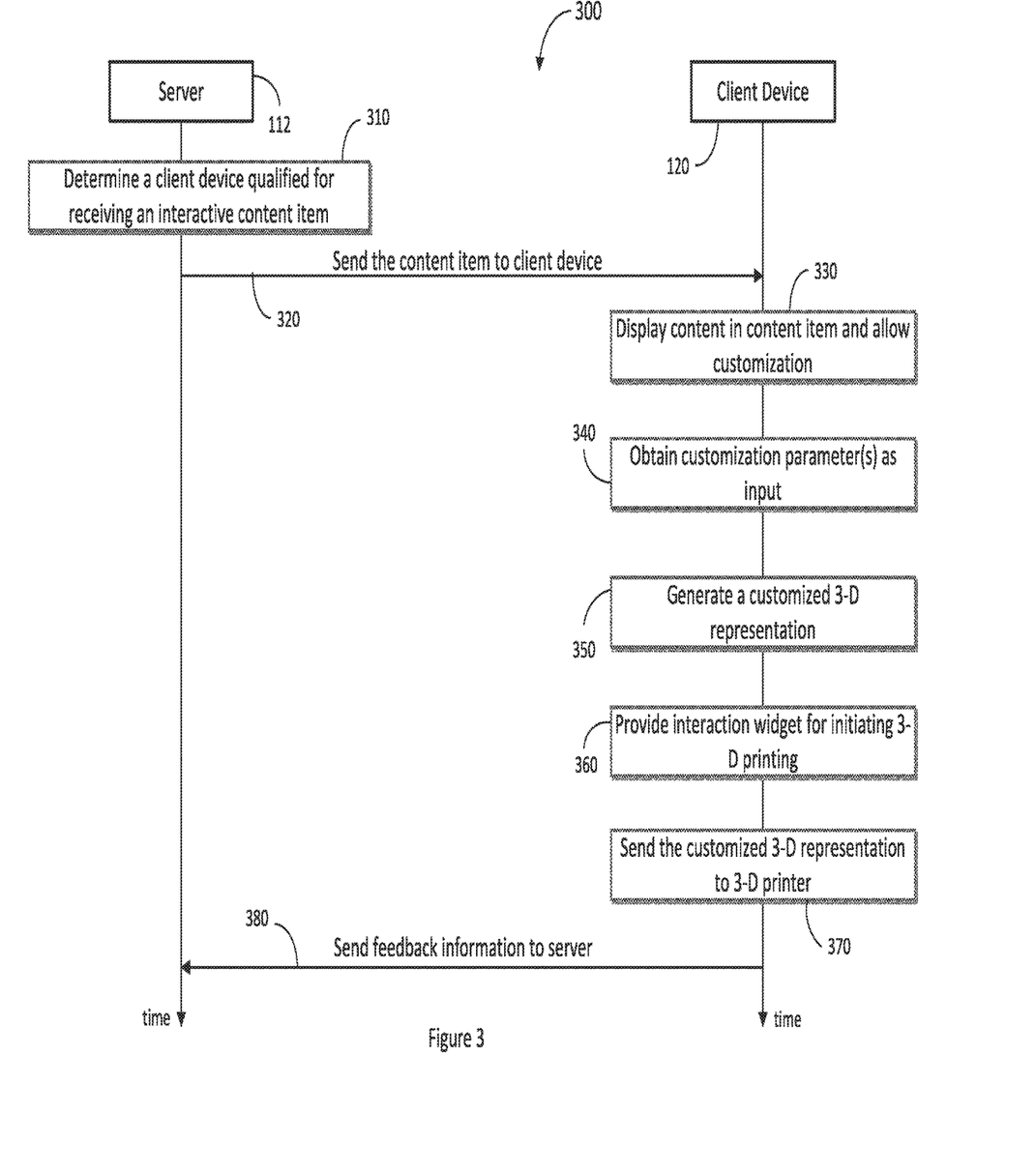
FIG. 3 is a flowchart illustrating another illustrative implementation of a method of enabling customization and 3-D prototyping of a 3-D representation of an object associated with an interactive content item.

FIG. 3 is a flowchart illustrating another illustrative implementation of a method of enabling customization and 3-D prototyping of a 3-D representation of an object associated with an interactive content item. According to the implementation shown in FIG. 3, the interactive content item is a stand-alone interactive content item designed to enable customization and 3-D printing of a representation of the object with none, or little, interaction with the computer server 112. The computer server 112 selects 310 an interactive content item and sends 320 it to the client device 120. The processes 310 and 320 are similar to the processes 210 and 220, respectively, described in relation to FIG. 2. The interactive content item, or a browser application, causes media content and interaction content, associated with interactive content item, to be displayed 330 on a display of the client device 120 for the user to view. According to at least one implementation, the media content and the interaction content are displayed within a window associated with the browser application, a game application, a weblet, or the like. Using the interactive content, the end user inputs/selects one or more customization parameters associated with the object. The interaction content item, the browser application, or another application may obtain 340 the input customization parameter(s) through input modules of the client device 120. The processes 330 and 340 are similar to the processes 230 and 240 of FIG. 2. In some implementations, the interaction content includes a request to the end user to specify whether or not a 3-D prototyping device 107 is available to the client device 120. In such case, 3-D printing may be allowed or not based on the end user's response.

The interactive content item generates 350 a customized 3-D representation of the object based on the input customization parameter(s). In generating 350 the customized 3-D representation of the object, the interactive content item, or another application, may either construct the 3-D representation based on 2-D data and/or other data, or retrieve a 3-D representation corresponding to the input customization parameter(s) from a plurality of 3-D representations stored in a data base associated with the interactive content item. In generating the customized 3-D representation, settings of the 3-D printer 107 may be taken into consideration. The resolution, the color set, or other features of the generated 3-D representation may be set based on corresponding settings' parameters of the 3-D printer 107. The generated 3-D representation may be displayed by the client device 120 for viewing by the end user. Alternatively, the generated 3-D representation is not displayed to the end user once generated.

According to an illustrative implementation, the interaction content item, or another application, causes an interaction widget to be displayed 360 by the client device 120, therefore, allowing the end user to initiate 3-D printing of the customized 3-D representation. In some instances, the interaction widget is provided 360 once the customized 3-D representation is available at the client device 120. Alternatively, the interaction widget is provided 360 for initiating customization and 3-D printing at once. That is, the interaction widget is presented 360 with, or prior to, presentation of other interaction tools for customizing a representation of the object.

Once customization of a representation of the object is complete, the client device 120 causes 270 the customized 3-D representation to be 3-D printed by a 3-D printer 107 coupled to the client device. In some instances, causing 3-D printing of the customized 3-D representation includes sending the 3-D representation to the 3-D printer 107. In other instances, the customized 3-D representation may be constructed at the 3-D printer 107 based on 2-D data and/or other data provided by the client device 120 to the 3-D printer 107. Also, 3-D printing may be initiated, or caused, in response to the end user interacting with the interaction widget, in response to the customized 3-D representation becoming available at the client device 120, or in response to completion of the customization by the end user. No interaction widget for 3-D printing is presented by the client device 120 and the client device sends a printing request to the 3-D printer 107 upon the end user confirms, or simply provides, the customization parameter(s).

The client device 120 may further send 380 feedback information to the computer server 112. The feedback information includes indication(s) of whether or not the end user interacted with the interaction content item, whether or not a 3-D representation was 3-D printed, other information, or combinations thereof. Sending the feedback information to the computer server may be optional.

A person skilled in the art should appreciate that the illustrative implementations described herein are for illustrative purposes and other implementations are possible. Generating the 3-D representation (260 or 350) is optional as the 3-D representation may be constructed by the 3-D printer 307. Also, presenting the interaction widget for initiating 3-D printing is optional as 3-D printing may be caused in response to completed customization by the end user.

According to at least one illustrative implementation, the client device 120 is allowed a pre-defined number of 3-D prints of the customized representation. The customized 3-D representation or corresponding data used for 3-D printing may be associated with a counter indicative of the pre-defined number of 3-D prints permitted. The counter is decremented in response to each printing request sent to the 3-D printer 107 in relation to the customized representation of the object. Once the counter reaches a minimum value, the client device 120 is prevented from accessing, or sending to the 3-D printer 107, data used to generate a 3-D print of the customized representation of the object. The pre-defined number of 3-D prints may be embedded in the interaction content item or may be provided by the computer server 112 when providing 270 a customized 3-D representation of the object.

According to at least one illustrative implementation, the customized 3-D representation includes a corresponding identifier embedded therein. The identifier may be a promotion code, a coupon code, an identifier of a model of the object selected by the end user as part of the customization process. In some instances, the identifier is visible in the 3-D prototype of the customized 3-D representation provided by the 3-D printer 107.

Figure 4:
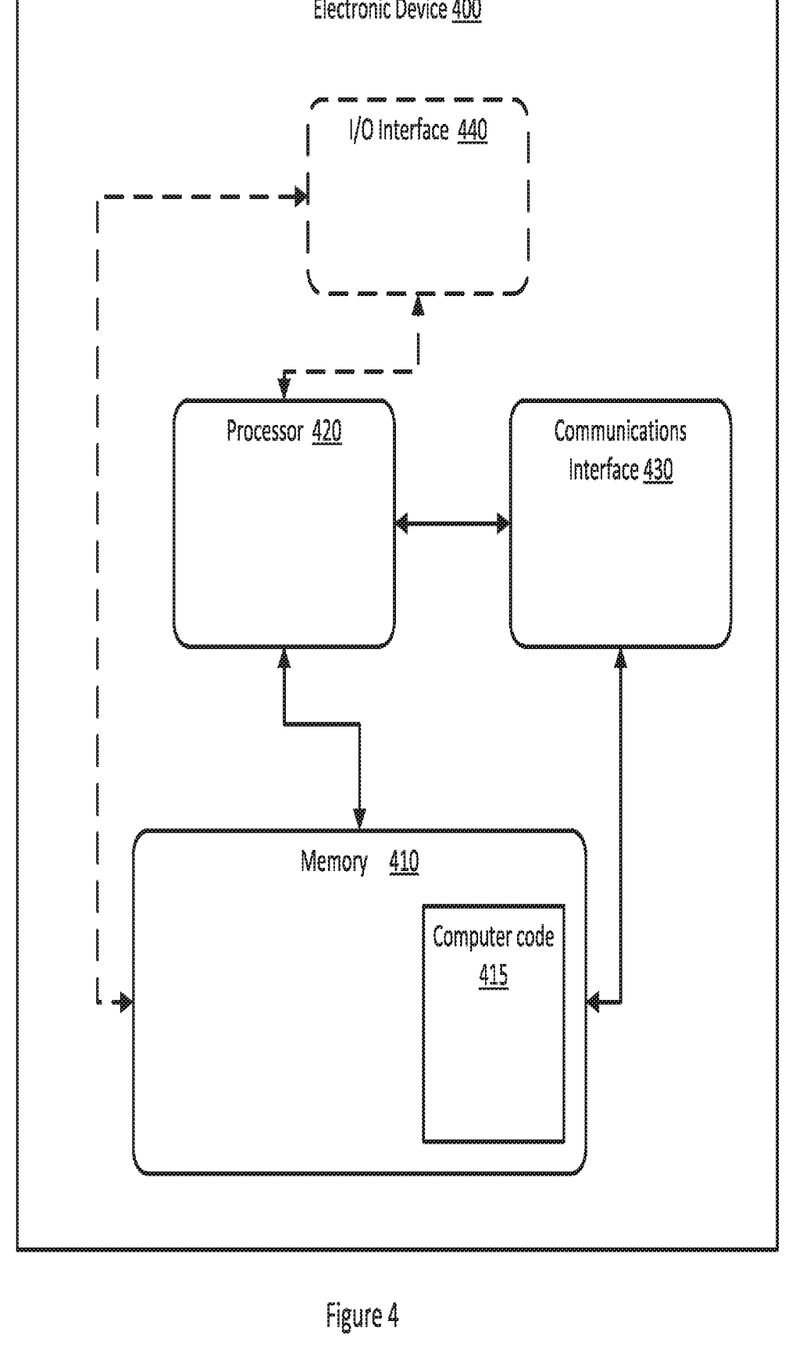
FIG. 4 shows a block diagram representing an illustrative implementation of an electronic device.

FIG. 4 shows a block diagram representing an illustrative implementation of an electronic device 400. The electronic device includes a memory 410 with computer code instructions 415 stored thereon. The memory 410 may further store data and/or one or more data structures. The electronic device 400 also includes a processor 420, coupled to the memory 410, for executing instructions such as the computer code instructions 415. The computer code instructions 415 include at least computer code that when executed causes one or more of the processes described in this disclosure to be performed. The electronic device 400 further includes a communications interface 430 for communicating with other devices. The communications interface 430 is coupled to processor 420. The communication interface 430 may be further coupled to the memory 410. The electronic device 400 may further include an input/output (I/O) interface 440 for interacting with a user of the electronic device 400. The I/O interface 440 is coupled to the processor 410. The I/O interface 440 may be further coupled to the memory 410. A person skilled in the art should appreciate that the electronic device 400 may include more than one processor 410, more than one memory, more than one communications interface 430, and/or more than one I/O interface 440. The electronic device 400, includes a client device such as the client device 120, a computer server such as the server 112, or any other network device.

What is claimed is:

1. An apparatus for printing three-dimensional prototypes of objects, the apparatus comprising:
a network interface in communication with a client device, and a processor executing a resource server, the network interface is configured to:
provide, to the client device, a representation of a three-dimensional object for display on the client device; and
receive a request for a three-dimensional model of the three-dimensional object for printing a three-dimensional prototype of the three-dimensional object on a three-dimensional printer communicatively coupled to the client device; and
the resource server is configured to:
responsive to receipt of the request, generate the three-dimensional model of the three-dimensional object with an identifier embedded on a visible surface of the three-dimensional model of the three-dimensional object, the identifier comprising a coupon code or a promotion code; and
provide the three-dimensional model of the three-dimensional object to the client device for printing the three-dimensional prototype of the three-dimensional object on the three-dimensional printer communicatively coupled to the client device.

2. The apparatus of claim 1, wherein the client device is limited to a number of three-dimensional object prototypes to be printed based on a counter.

3. The apparatus of claim 1, wherein the network interface is further configured to receive information indicative of settings of the three-dimensional printer from the client device.

4. The apparatus of claim 3, wherein the resource server is further configured to generate the three-dimensional model based on the information indicative of the settings of the three-dimensional printer received from the client device.

5. The apparatus of claim 1, wherein the three-dimensional model is forwarded by the client device to the three-dimensional printer for printing the three-dimensional prototype.

6. The apparatus of claim 1, wherein the network interface is further configured to provide a user interaction module for execution by the client device, the user interaction module providing an interface for initiating three-dimensional printing of the three-dimensional prototype.

7. The apparatus of claim 1, wherein the network interface is configured to provide the representation of the three-dimensional object to the client device within an interactive third party content item.

8. The apparatus of claim 7, wherein the interactive third party content item includes an interaction widget for initiating three-dimensional printing of the three-dimensional prototype.

9. The apparatus of claim 1, wherein the identifier comprises an identifier of a model of the three-dimensional object.

10. A method of printing three-dimensional prototypes of objects, the method comprising:
providing, by a computer server to a client device, a representation of a three-dimensional object for display on the client device;
receiving, by the computer server, a request for a three-dimensional model of the three-dimensional object for printing a three-dimensional prototype of the three-dimensional object on a three-dimensional printer communicatively coupled to the client device;
generating, by the computer server, responsive to receipt of the request, the three-dimensional model of the three-dimensional object with an identifier embedded on a visible surface of the three-dimensional model of the three-dimensional object, the identifier comprising a coupon code or a promotion code; and
providing the three-dimensional model of the three-dimensional object to the client device for printing the three-dimensional prototype of the three-dimensional object on the three-dimensional printer communicatively coupled to the client device.

11. The method of claim 10, wherein the client device is limited to a number of three-dimensional prototype objects to be printed based on a counter.

12. The method of claim 10 further comprising receiving information indicative of settings of the three-dimensional printer from the client device.

13. The method of claim 12, wherein generating the three-dimensional model is further based on the information indicative of the settings of the three-dimensional printer received from the client device.

14. The method of claim 10, wherein the three-dimensional model is forwarded by the client device to the three-dimensional printer for printing the three-dimensional prototype.

15. The method of claim 10 further comprising providing a user interaction module for execution by the client device, the user interaction module providing an interface for initiating three-dimensional printing of the three-dimensional prototype.

16. The method of claim 10 further comprising providing the representation of the three-dimensional object to the client device within an interactive third party content item.

17. The method of claim 16, wherein the interactive third party content item includes an interaction widget for initiating three-dimensional printing of the three-dimensional prototype.

18. The method of claim 10, wherein the identifier comprises an identifier of a model of the three-dimensional object.

* * * * *